United States Patent [19]

Scheulderman

[11] Patent Number: 5,762,155
[45] Date of Patent: Jun. 9, 1998

[54] WHEELCHAIR FRAME AND CASTOR ASSEMBLY

[75] Inventor: Petrus Johannes Scheulderman, Almere, Netherlands

[73] Assignee: Richard van Seenus Nederland B.V., Almere, Netherlands

[21] Appl. No.: 543,267

[22] Filed: Oct. 16, 1995

[30] Foreign Application Priority Data

Nov. 29, 1994 [NL] Netherlands ............... 9402006

[51] Int. Cl.$^6$ .................................................. B60K 1/02
[52] U.S. Cl. .................. 180/65.1; 180/907; 180/6.5;
16/35 D; 280/725; 280/268
[58] Field of Search ............... 16/44, 35 D; 180/65.1,
180/907, 6.62, 6.5; 280/250.1, 304.1, 268,
271, 724, 725

[56] References Cited

U.S. PATENT DOCUMENTS

| 940,783 | 11/1909 | Buckland | 280/271 |
|---|---|---|---|
| 2,482,961 | 9/1949 | Bishop | 16/35 D |
| 2,620,235 | 12/1952 | Butler | 16/35 D |
| 3,064,744 | 11/1962 | Jennings | 180/6.5 |
| 4,280,246 | 7/1981 | Christensen | 16/35 D |
| 4,614,246 | 9/1986 | Masse et al. | 180/6.5 |
| 5,028,064 | 7/1991 | Johnson | 280/250.1 |
| 5,222,567 | 6/1993 | Broadhead et al. | 180/15 |
| 5,275,248 | 1/1994 | Finch et al. | 180/65.6 |

FOREIGN PATENT DOCUMENTS

| 117239 | 7/1943 | Australia | 16/35 D |
|---|---|---|---|
| 2 479 104 | 10/1981 | France . | |
| 549773 | 12/1942 | United Kingdom | 16/35 D |
| 2 275 029 | 8/1994 | United Kingdom . | |
| WO 88/10109 | 12/1988 | WIPO . | |
| WO 94/13241 | 6/1994 | WIPO . | |
| WO 95/08449 | 3/1995 | WIPO . | |

OTHER PUBLICATIONS

Polytechnisch Tijdschrift Werktuigbouw, No. 8, 1993, NL.

*Primary Examiner*—Brian L. Johnson
*Assistant Examiner*—Avraham Lerner
*Attorney, Agent, or Firm*—Westman, Champlin & Kelly, P.A.; S. Koehler

[57] ABSTRACT

A wheelchair frame comprises a base frame part (1, 2) with a plurality of wheels (3, 33), including two front wheels (3), wherein each of said front wheels can be driven by an electromotor (4). The base frame part carries at the back side a castor assembly (13) located in the center and comprising a swivel axle (14) with a neutral straight on position, wherein a device 22 is are provided for exerting a rotation force on the swivel axle in the direction of the straight on position at rotation of the swivel axle out of the straight on position.

15 Claims, 4 Drawing Sheets

WHEELCHAIR FRAME AND CASTOR ASSEMBLY

BACKGROUND OF THE INVENTION

The invention relates to a wheelchair frame comprising a base frame part with a plurality of wheels including two front wheels, wherein each of said front wheels can be driven by an electromotor.

In the known wheelchair frame of this type two separate castors are provided at the backside of the base frame part. Although the use of driven front wheels provides the possibility to use relatively large front wheels whereby obstacles can be passed well, the maneuverability of the known wheelchair frame leaves much to be desired. At higher speeds, i.e. faster than 6 km/h, the straight on stability of the wheelchair frame is bad. In the known wheelchair frame one tries to overcome this problem by a tachogenerator control of the driving motors and/or the application of a control of the castors. Thus, known wheelchair frames are relatively expensive and complicated. Further, the known wheelchair frame has the disadvantage that the batteries required as power supply of the electromotors are completely built in the wheelchair frame, such that the batteries are difficult to access, usually only after removing a seat mounted on the wheelchair frame. Further the base frame part of the known wheelchair frame comprises generally at least four tubular elements which are time consuming to manufacture.

The invention aims to provide a wheelchair frame of the above-mentioned type wherein said disadvantages are obviated.

SUMMARY OF THE INVENTION

According to the invention the wheelchair frame includes a base frame part which carries at the backside a castor assembly located in the center and comprising a swivel axle with a neutral straight on position. Means are provided for exerting a rotation force on the swivel axle in the direction of the straight on position at rotation of the swivel axle out of the straight on position.

In this manner a wheelchair frame is provided, the castor assembly of which makes the wheelchair frame very maneuverable. Further, the wheelchair frame has excellent straight on stability at high speeds while maintaining the high maneuverability of the wheelchair frame.

According to a preferred embodiment of the invention each front wheel is rotatably supported by a support arm rotatably connected to a transverse axle in such a manner that the rotation axis of the front wheels lies ahead of the transverse axle as seen in forward direction, wherein a common spring means is provided for both front wheels, said spring means being connected to the base frame part at one end and to both support arms at the other end. In this manner it is obtained that when braking, the wheelchair frame will not gallop. Thereby the comfort for the user is increased and the stability of the wheelchair frame is guaranteed even at braking on downwardly sloping surfaces.

According to a another embodiment the spring means comprises a gas spring and a helical spring which are mounted in a telescoping housing. The spring means is provided such that the action of the gas spring can be adjusted to absorb the own weight of the complete wheelchair and a part of the weight of the user and the helical spring can be adjusted to an optimal spring comfort.

The invention further provides a castor assembly comprising a swivel axle with a neutral straight on position, which is for example suitable to be used in the described wheelchair frame but can also be advantageously used in another type of wheelchair frame or in other moving constructions comprising castors.

According to the invention the swivel axle of the castor assembly is provided with an eccentric member which is substantially fittingly positioned between the spring legs of a fork in the straight on position, said fork being formed by two identical fork legs each comprising a half-round seating and being pressed with the seating on a bearing pin by a spring means. Thus improved straight on stability of the castor is provided with a relatively simple construction.

BRIEF DESCRPTION OF THE DRAWINGS

The invention will be further explained hereinafter by reference to the drawings in which embodiments of the wheelchair frame and the castor assembly according to the invention are shown.

FIGS. 1–3 schematically show side views of an embodiment of the wheelchair frame according to the invention in different positions.

DETAILED DESCRIPTION OF THE PREFERRED EMBODIMENTS

Figure 1:
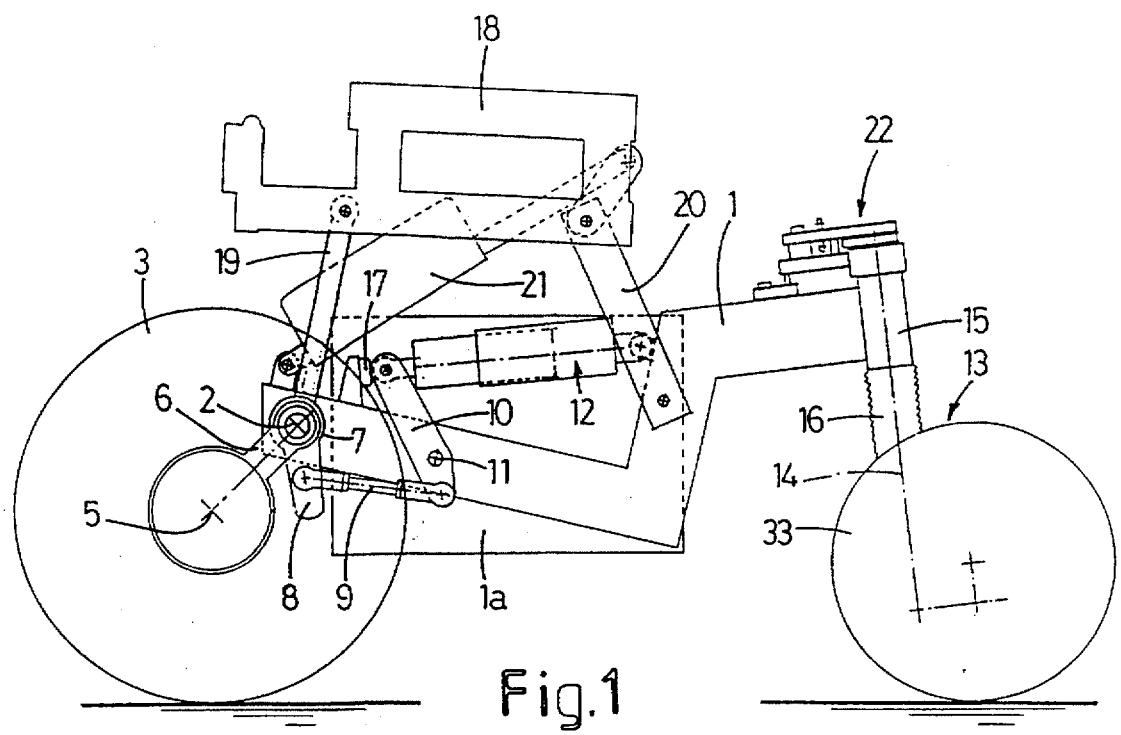
Figure 2:
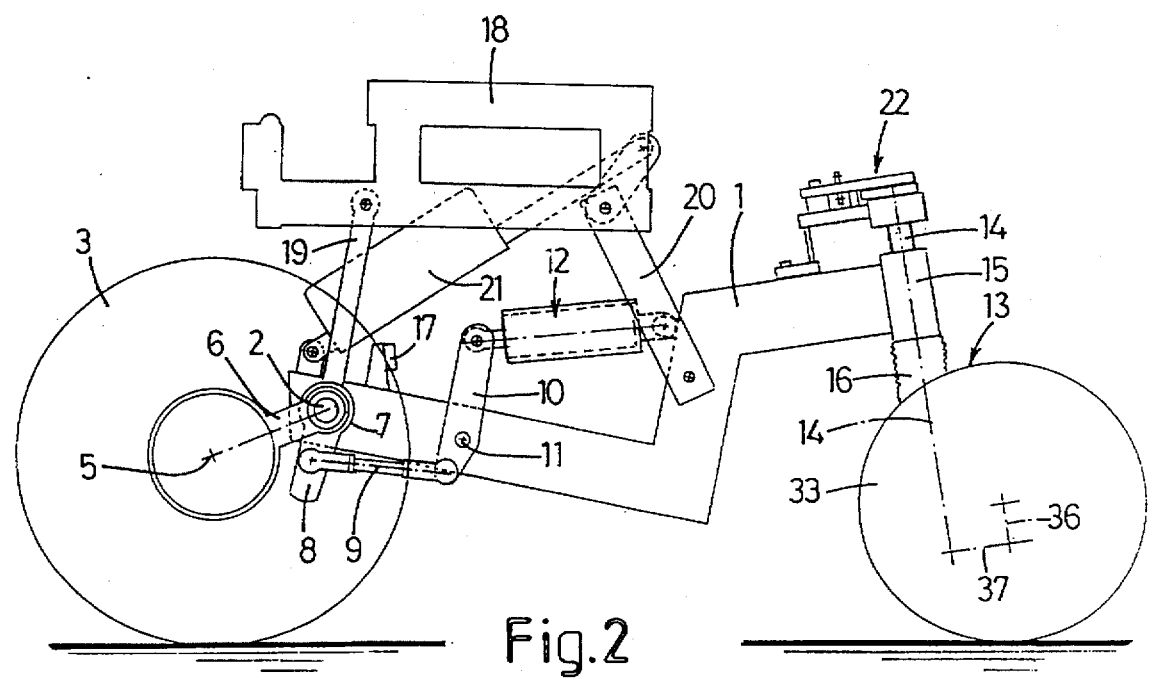
Figure 3:
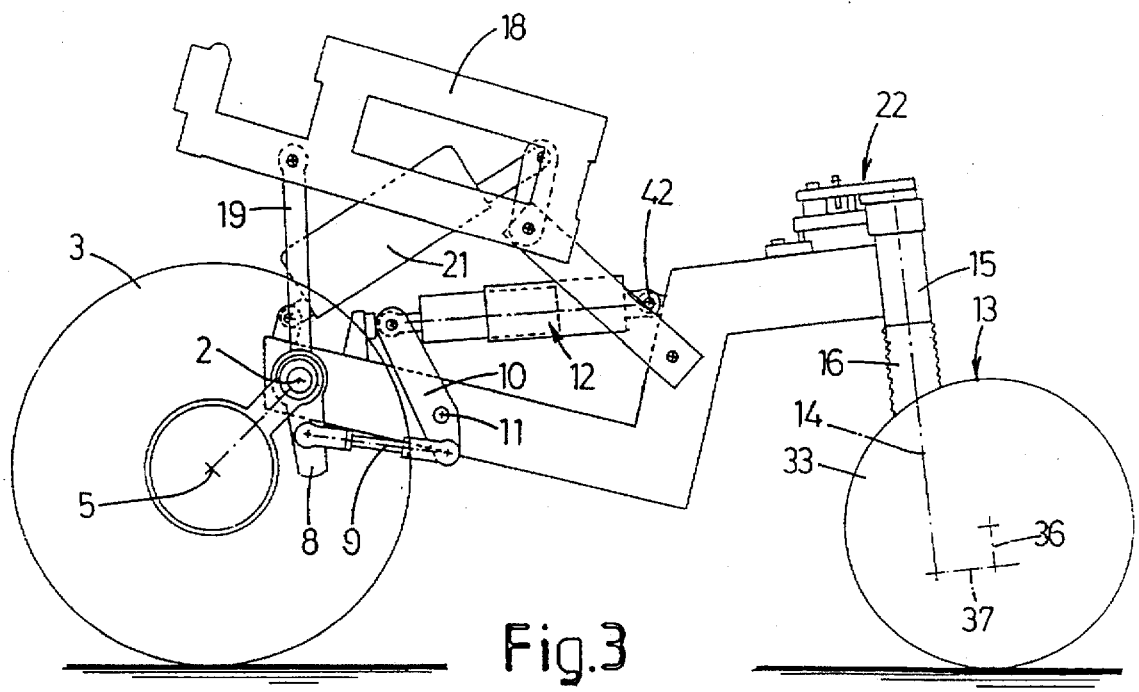
Figure 4:
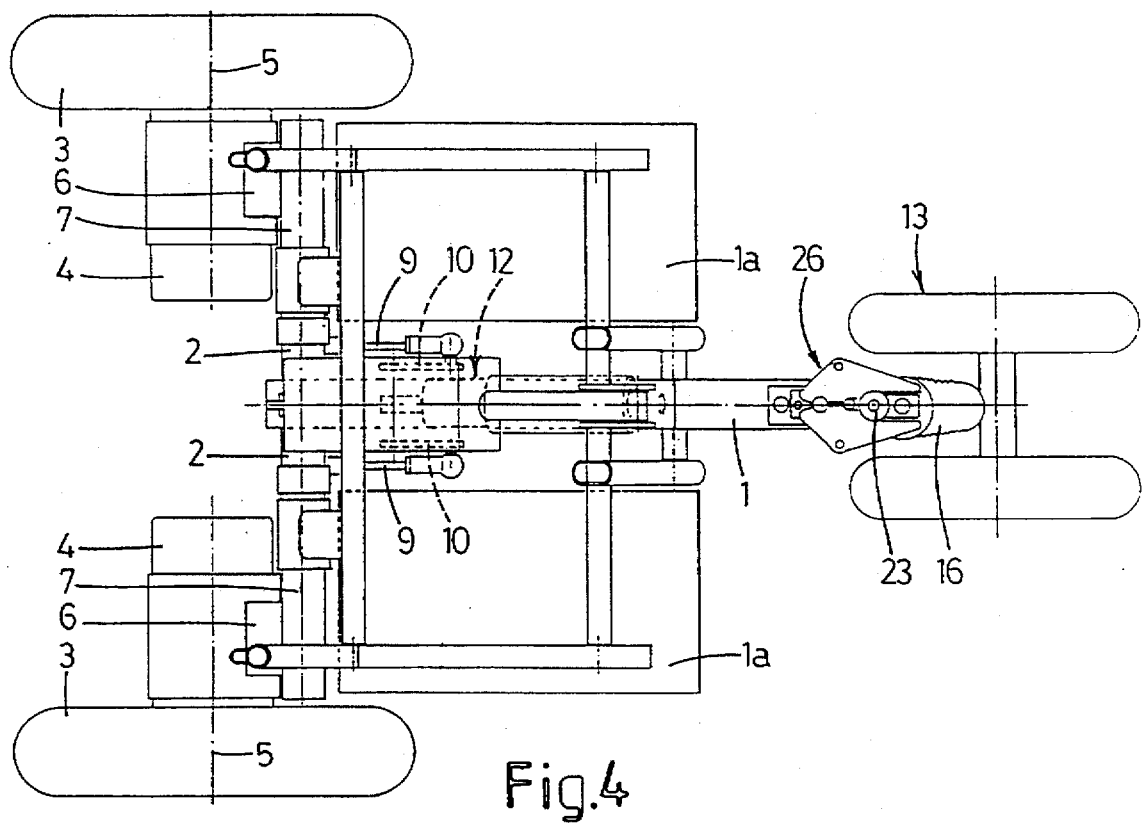
FIG. 4 is a top view of the wheelchair frame of FIGS. 1–3.

FIGS. 1–3 show side views of a wheelchair frame in different positions and FIG. 4 shows a top view of this wheelchair frame. The wheelchair frame shown comprises a central beam 1 extending in driving direction and carrying a transverse axle 2 at a front portion. The central beam 1 and the transverse axle 2 together form a base frame part of the wheelchair frame. The transverse axle 2 carries at each end a front wheel 3 which can be driven by an electric motor 4. Each wheel 3 is rotatable around a schematically indicated axis 5 and is rotatably connected with the transverse axle 2 by means of a support arm 6 and a bushing 7, wherein the axis 5 lies ahead of the transverse axle 2 as seen in driving direction. A coupling arm 8 is attached to each bushing 7 and the coupling arm 8 is connected to a lever 10 by a pulling rod 9. As shown in the top view of FIG. 4, the levers 10 are mounted at both sides on the central beam 1 rotatably around an axis 11. The opposite end of the levers 10 is connected with one end of a spring means 12 which at its other end is connected to the central beam 1. In the described manner the spring means 12 forms a common spring means for the front wheels 3 lying centrally above the central beam 1 so that a very compact frame construction is obtained. The described construction of the wheelchair frame further shows the advantage that spaces 1a (see FIGS. 1 and 4) for the usual batteries for the power supply of the electric motors 4 are formed at both sides of the central beam 1, said spaces 1a being easily accessible from the sides of the wheelchair frame. Thus, checking and maintenance of the batteries is facilitated because it is not necessary for the user to leave the wheelchair.

The central beam 1 carries at its backside a castor assembly 13 comprising a swivel axle 14 slidably mounted in a bushing 15 which is attached to the end of the central beam 1. The swivel axle 14 is slidable in the bushing 15 against the action of a spring 16.

FIG. 1 shows the wheelchair frame in an uncompressed position, wherein one end of the spring means 12 presses against a stop 17 of the central beam 1. FIG. 2 shows the wheelchair frame in a compressed position as caused by a user not shown. By the suspension of the front wheels 3 as described with the common spring means 12 it is obtained that the wheelchair frame will not gallop during braking but will rather move somewhat upwardly. This increases significantly the comfort of the user and also enhances the stability of the wheelchair frame, especially during braking on a downwardly sloping surface.

In the embodiment shown, the base frame part supports a seat frame part 18 with adjustable seat angle by means of front rods 19 and back rods 20. A spindle motor 21 is provided for adjusting the seat angle of the seat frame part 18. In FIGS. 1 and 2 the seat frame part is adjusted in a relatively flat position and in FIG. 3 in the most rearwardly sloping position. For a further explanation of the adjustable seat frame part reference is made to EP-A-0 512 650 of the same applicant.

Figure 6:
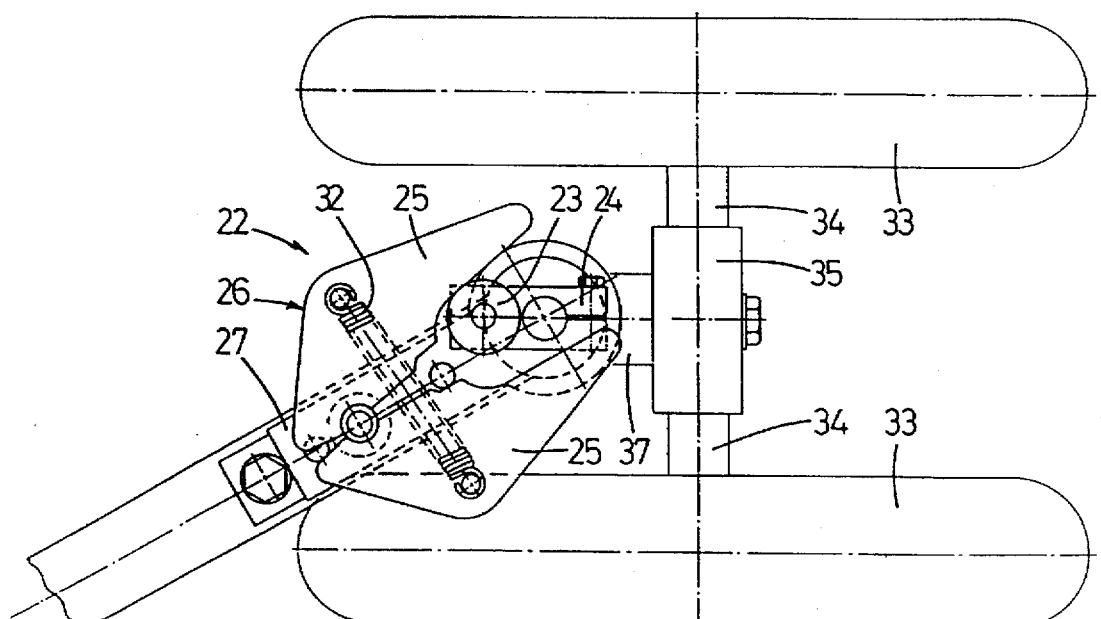
Figure 7:
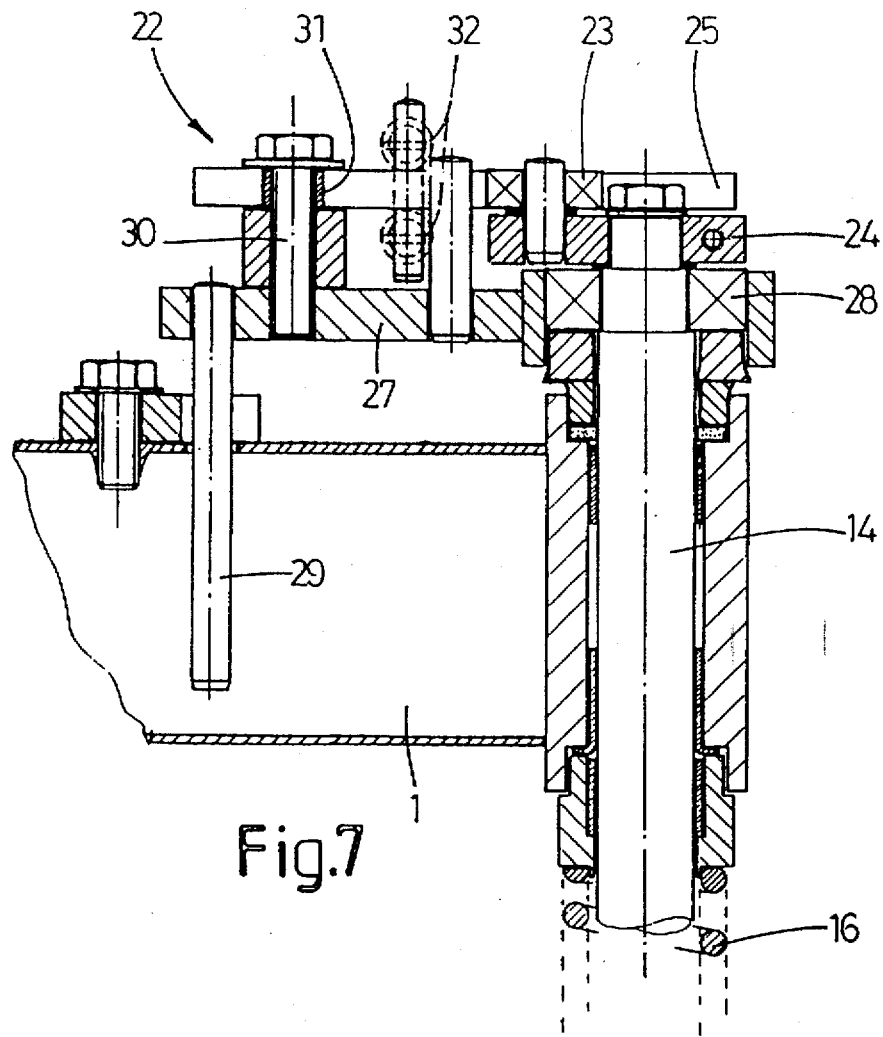
FIG. 7 is a partially shown cross-section of the castor assembly of the wheelchair frame of FIG. 1.

The central castor assembly 13 provides for a high degree of manoeuvrability of the wheelchair frame. In order to provide increased straight on stability at high driving speeds, i.e. faster than 6 km/h, the castor assembly 13 comprises means 22 which upon rotation of the swivel axle 14 from a neutral straight on position shown in FIG. 5 to for example the position shown in FIG. 6, exerts a rotation force on the swivel axle 14 in the direction of the straight on position. These means comprise an eccentric member mounted on the swivel axle 14 made as a ball bearing 23 attached on the swivel axle 14 by means of a connecting clamp 24. In the neutral straight on position the ball bearing 23 lies substantially fittingly between the spring legs 25 of a fork 26. This fork 26 is mounted on a support plate 27 which is rotatably supported by the swivel axle 14 by means of a ball bearing 28 (see FIG. 7). This support plate 27 has a pin 29 slidably mounted in the central beam 1 in the direction of movement of the swivel axle 14 during compressing the wheelchair frame. Pin 29 rotationally fixes the support plate 27 with respect to the central beam 1 in a rotational direction of the swivel axle 14. The support plate 27 carries a bearing pin 30 for the fork legs 25. These fork legs 25 are identical and each comprise a substantially half-round seats 31, wherein the fork legs 25 are pressed on the bearing pin 30 with the seats 31 by two springs 32 lying above and below the fork legs, respectively.

Figure 5:
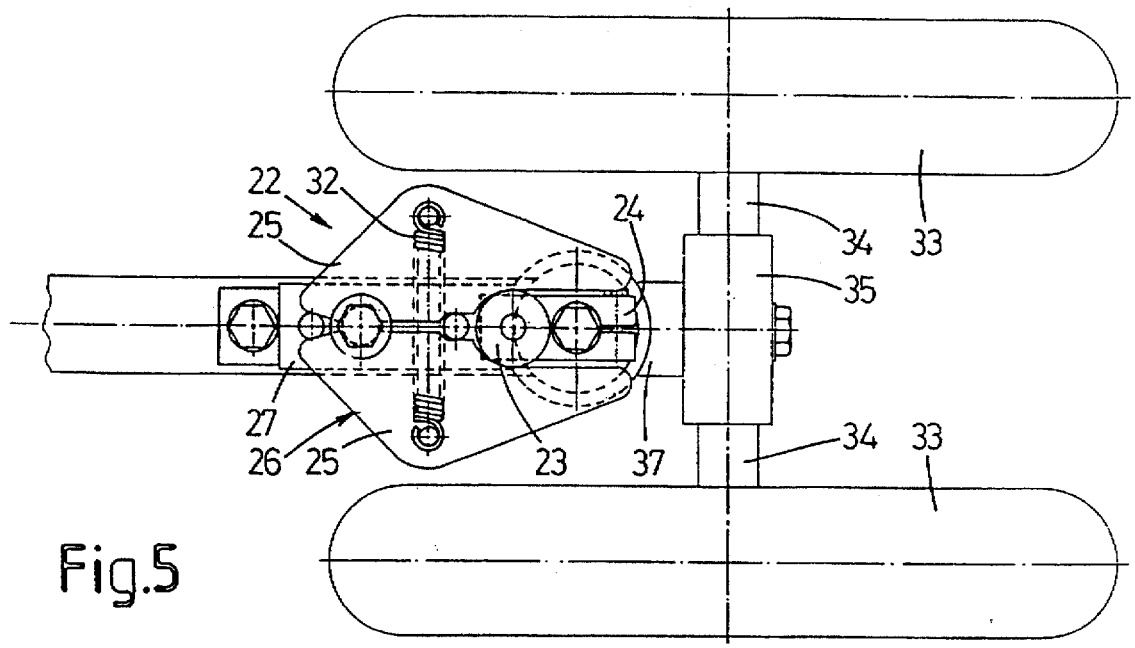
FIGS. 5 and 6 show a more detailed top view of the castor assembly of the wheelchair frame of FIG. 1 in two positions.

During straight on driving (i.e. the swivel axle 14 is in the neutral straight on position as shown in FIG. 5) the fork legs 25 maintain the swivel axle 14 in this straight on position so that the wheelchair has a good straight on stability. When the electromotors 4 are controlled in a usual manner for taking a bend, the swivel axle 14 can easily rotate in the bushing 15, for example into the position shown in FIG. 6, wherein one fork leg 25 is pressed away against the action of the springs 32 by the ball bearing 23. When one drives straight on again, the fork leg 25 presses the swivel axle back into the neutral position.

As shown in the drawings, the castor assembly 13 comprises two wheels 33 lying at a short distance from each other with a common axle 34 received in a bushing 35. This bushing 35 is connected to the swivel axle 14 through a schematically indicated support 36 and a schematically indicated longitudinal shaft 37. The axle 34 is rotatable around the longitudinal shaft 37 which is aligned with the central beam 1.

Figure 8:
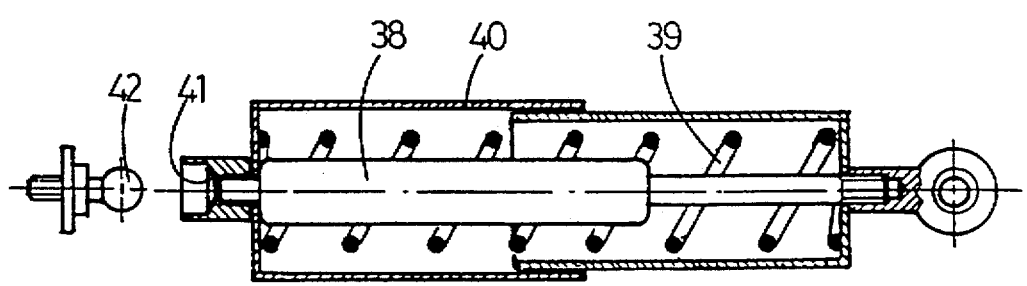
FIG. 8 shows a cross-section of the spring means of the wheelchair frame of FIG. 1.

FIG. 8 shows a cross-section of the spring means 12. As shown in FIG. 8, the spring means 12 comprises a gas spring 38 and a helical spring 39 which are mounted in the telescoping housing 40. One end of housing 40 rests with a seat 41 on a ball 42 which is attached to the central beam 1. The other end of the housing 40 is rotatably coupled to the levers 10. The gas spring 38 provides a force which is sufficient for taking the weight of the wheelchair frame and a part of the weight of the user so that the helical spring 39 can be adjusted for providing spring comfort for the user. The spring force of the helical spring 39 and the spring force of the spring 16 are mutually adjusted in such a manner that the central beam 1 will move substantially vertically up and down during compressing the wheelchair frame.

It is noted that the castor assembly 13 with the means 22 for providing a high straight on stability can also be used at another type of wheelchair frame or at other types of moving constructions provided with castors.

The invention is not restricted to the above-described embodiment which can be varied within a number of ways within the scope of the claims.

I claim:
1. A wheelchair frame comprising:
   a base frame part having a front portion and a rear portion;
   a fork assembly mounted to the rear portion, the fork assembly having two legs movable between a neutral position and an urging position;
   a pair of front wheels rotatably coupled to the front portion of the base frame part defining a longitudinal center plane of the base frame part therebetween;
   an electric motor coupled to each front wheel; and
   a castor assembly rotatably coupled to the rear portion of the base frame part by a swivel axle at the center plane, the castor assembly having a neutral straight on position, the castor assembly further coupled to the fork assembly and having an eccentric member which is substantially fittingly positioned between the legs of the fork assembly when the castor assembly is in the neutral straight on position; and
   wherein rotation of the castor assembly from the neutral straight on position causes the eccentric member to move at least one of the legs from the neutral position in a direction away from the center plane to the urging position such that a restoring force is imparted on the castor assembly to rotate the castor assembly back to the neutral straight on position.

2. The wheelchair frame according to claim 1, wherein the eccentric member further comprises:
   a connection arm attached to the swivel axle; and
   a ball bearing attached to the swivel axle by the connection arm.

3. The wheelchair frame according to claim 1, wherein the legs of the fork assembly are identical and each leg includes a half round seat and wherein the fork assembly comprises:
   a bearing pin; and
   a spring coupled to the legs urging the half round seats toward the bearing pin.

4. The wheelchair frame according to claim 1, wherein the front wheels are spring mounted in the base frame part, and wherein the rear portion further comprises:
   a bushing disposed in the center plane of the base frame part, slidably coupling the swivel axle to the rear portion;
   a spring bearing against the swivel axle;
   a pin slidably guided in the base frame part; and
   a support plate coupled to the base frame part, and rotationally fixed thereto by the pin, the support plate supports the fork assembly and is rotatably mounted to the swivel axle.

5. The wheelchair frame according to claim 1, wherein the castor assembly further comprises:
   a wheel axle;
   a pair of wheels spaced apart from each other on the wheel axle by a distance less than a diameter of one of the wheels, with the axle substantially centered between the wheels; and
   a longitudinal shaft attached to the swivel axle and to the wheel axle at a location substantially equidistant from each wheel, such that the axle is pivotable about the longitudinal shaft.

6. The wheelchair frame according to claim 1 and further comprising:
   a transverse axle coupled to the front portion of the base frame part;
   a first support arm coupled to the transverse axle and supporting one of the pair of front wheels such that the one of the pair of front wheels rotates about an axis which lies ahead of the transverse axle in a forward direction;
   a second support arm coupled to the transverse axle and supporting the other of the pair of front wheels such that the other of the pair of front wheels rotates about an axis which lies ahead of the transverse axle in a forward direction; and
   a common front spring coupled to the base frame part at a first end and to both support arms at a second end.

7. The wheelchair frame according to claim 6, wherein the base frame part further comprises:
   a central beam extending from the front portion to the rear portion and carrying the transverse axle at the front portion; and
   first and second levers pivotably disposed on opposite sides of the central beam, each lever having a first end and a second end, wherein the first end of each lever is coupled to the common front spring, and the second end of the first lever is coupled to the first support arm, and the second end of the second lever is coupled to the second support arm.

8. The wheelchair frame according to claim 7 and further comprising:
   first and second bushings disposed in the front portion of the base frame part, each bushing rotatably coupling one of the support arms on the transverse axle;
   a first pulling rod having first and second ends, the first end of the first pulling rod coupled to the first lever at the second end of the first lever;
   a second pulling rod having first and second ends, the first end of the second pulling rod coupled to the second lever at the second end of the second lever;
   a first coupling arm coupled to the first bushing and the second end of the first pulling rod;
   a second coupling arm coupled to the second pushing and the second end of the second pulling rod; and
   wherein pivotal movement of the front wheels about the transverse axle causes a deflection of the common spring.

9. The wheelchair frame according to claim 6, and further comprising:
   a ball disposed on the central beam;
   a telescoping. housing rotatably coupled to the pair of levers on a first end and engaging the ball on a second end; and
   wherein the spring comprises a gas spring and a helical spring coupled to each end of the telescoping housing within the telescoping housing.

10. A castor assembly comprising:
    a swivel axle;
    a support plate rotatably mounted to the swivel axle;
    a bearing pin secured to the support plate remote from the swivel axle;
    a fork assembly disposed on the support plate having a pair of fork legs each leg having a half-round seat;
    a spring urging the half-round seats of the fork legs upon the bearing pin; and
    an eccentric member provided on the swivel axle and substantially fittingly positioned between the fork legs in a neutral straight on position wherein rotation of the swivel axle relative to the support plate moves at least one of the legs against the spring to create a restoring force to return the eccentric member to the neutral straight on position.

11. A wheelchair frame comprising:
    a base frame part having a front portion and a rear portion;
    a transverse axle coupled to the front portion of the base frame part;
    a fork assembly mounted to the rear portion, the fork assembly having two legs movable between a neutral position and an urging position;
    a pair of front wheels spring mounted and rotatably coupled to the transverse axle defining a longitudinal center plane of the base frame part therebetween such that the pair of front wheels rotates about an axis which lies ahead of the transverse axle in a forward direction;
    an electric motor coupled to each front wheel; and
    a castor assembly rotatably coupled to the rear portion of the base frame part at the center plane and having a neutral straight on position, the castor assembly further coupled to the fork assembly wherein rotation of the castor assembly from the neutral straight on position moves at least one of the legs from the neutral position in a direction away from the center plane to the urging position such that a restoring force is imparted on the castor assembly to rotate the castor assembly back to the neutral straight on position.

12. wheelchair frame according to claim 11, and further comprising:
    a first support arm coupled to the transverse axle and supporting one of the pair of front wheels;
    a second support arm coupled to the transverse axle and supporting the other of the pair of front wheels; and
    a common front spring coupled to the base frame part at a first end and to both support arms at a second end.

13. The wheelchair frame according to claim 12, wherein the base frame part further comprises:
    a central beam extending from the front portion to the rear portion and carrying the transverse axle at the front portion; and
    first and second levers pivotably disposed on opposite sides of the central beam, each lever having a first end and a second end, wherein the first end of each lever is coupled to the common front spring, and the second end of the first lever is coupled to the first support arm, and the second end of the second lever is coupled to the second support arm.

14. The wheelchair frame according to clam 13, and further comprising:

first and second bushings disposed in the front portion of the base frame part, each bushing rotatably coupling one of the support arms on the transverse axle;

a first pulling rod having first and second ends, the first end of the first pulling rod coupled to the first lever at the second end of the first lever;

a second pulling rod having first and second ends, the first end of the second pulling rod coupled to the second lever at the second end of the second lever;

a first coupling arm coupled to the first bushing and the second end of the first pulling rod;

a second coupling arm coupled to the second pushing and the second end of the second pulling rod; and wherein pivotal movement of the front wheels about the transverse axle causes a deflection of the common spring.

15. The wheelchair frame according to claim 14, and further comprising:

a ball disposed on the central beam;

a telescoping housing rotatably coupled to the pair of levers on a first end engaging the ball on a second end; and wherein the spring comprises a gas spring and a helical spring coupled to each end of the telescoping housing within the telescoping housing.

* * * * *

UNITED STATES PATENT AND TRADEMARK OFFICE
CERTIFICATE OF CORRECTION

PATENT NO.   : 5,762,155
DATED        : June 9, 1998
INVENTOR(S)  : Scheulderman It is certified that error appears in the above-identified patent and that said Letters Patent is hereby corrected as shown below:

On the title page item [57],

Line 7, before "provided", delete "are".

Column 4, line 30, after ";" delete "and".

Column 5, line 56, replace "pushing" with --bushing--.

Column 5, line 65, after "telescoping" delete ".".

Column 6, line 45, before "wheelchair" insert --The--.

Column 6, line 66, replace "clam" with --claim--.

Column 7, line 12, replace "pushing" with --bushing--.

Signed and Sealed this

Thirtieth Day of March, 1999

Attest:

Q. TODD DICKINSON

*Attesting Officer*   *Acting Commissioner of Patents and Trademarks*